INVENTOR.
HARRY S. JEWUSIAK
BY MAHONEY, MILLER & RAMBO
BY Wm. V. Miller
ATTORNEYS

July 21, 1970   H. S. JEWUSIAK   3,521,099
COMMUTATORLESS ROTARY ELECTRIC MACHINE
Filed Dec. 11, 1968   5 Sheets-Sheet 3

INVENTOR.
HARRY S. JEWUSIAK
BY
MAHONEY, MILLER & RAMBO
BY Wm. V. Miller
ATTORNEYS

3,521,099
COMMUTATORLESS ROTARY ELECTRIC MACHINE
Harry S. Jewusiak, 211 Collins St.,
Hartford, Conn. 06105
Continuation-in-part of application Ser. No. 604,867,
Dec. 27, 1966. This application Dec. 11, 1968, Ser.
No. 790,498
Int. Cl. H02k 17/42
U.S. Cl. 310—168                9 Claims

ABSTRACT OF THE DISCLOSURE

The rotary electric machines of this invention are of the type having a rotor winding and which may operate in either a direct or alternating current circuit as either a generator or motor. Necessity of commutation of the wound rotor is eliminated by utilization of a bipolar stator construction, as defined herein, and a novel rotor assembly revolvable in the magnetic field produced by the dipolar stator structure in cooperation with appropriate field coils magnetically coupled with the stator and energized by a suitable power source. The rotor structure is so designed as to produce a current flow in the same relative direction in all portions of the rotor winding that are effectively coupled with the magnetic field.

---

This application is a continuation-in-part of my copending application Ser. No. 604,867 filed Dec. 27, 1966.

GENERAL DESCRIPTION OF PRIOR ART

Development of rotary electric machines of the non-commutating type has been attempted previously resulting in the construction of several different types of machines. One of the earliest attempts directed toward the development of a machine of this type resulted in what is commonly referred to as a homo-polar machine. Its method of operation is based on the principle of the Faraday disc with one form being termed an "axial"-type in which all magnetic flux magnetically coupled with a toroidal rotor flows in the same axial direction and current conductors carried by the rotor will, therefore, only cut lines of magnetic flux which are flowing in the same direction. A serious shortcoming of homo-polar machines, as heretofore constructed, has been the relatively low output voltage due to physical limitations on the structure of the rotor conductors and the necessity of numerous slip rings for serially connecting several rotor conductors to increase the voltage output. Another more recent attempt at development of a non-commutating electric machine is disclosed in U.S. Pat No. 2,742,584 issued to Serna on Apr. 27, 1956. Serna's machine involves a complex rotor structure which cooperates with a stator construction that provides an effectively unidirectional magnetic flux to obtain a unidirectional current flow in the rotor. This complex rotor utilizes an ionizing gas which further complicates construction.

GENERAL DESCRIPTION OF THE INVENTION

The commutatorless rotary electric machine of this invention accomplishes the objective by means of a novel rotor assembly which is revolved in a magnetic field produced by a dipolar stator structure in cooperation with appropriate field coils magnetically coupled with the stator and energized by a suitable power source in which the poles alternate with the application of an A.C. voltage.

In any case the mechanical construction can be substantially identical although it can be repetitive as noted below. I refer to any of such constructions as a bipolar machine or a bipolar stator structure as the case may be. Bipolar in this context denotes a single north-south pole relationship, the polarity of which can be constant or alternating depending upon energization with acrylic or cyclic current, respectively. The bipolar stator structure, which forms the basis of this invention, is essentially similar to a typical homo-polar stator structure, and, when energized by a D.C. voltage, is properly termed a homo-polar stator structure.

The homo-polar type structure can also be energized by an alternating current without modification of the stator structure. The operation, then, is identical to the homo-polar machine with the exception that the north and south poles are in alternation. In either case the frequency is independent of the rotor speed and is, of course, zero for D.C. energization. In either mode of operation the machine remains commutatorless. Thus the structure of the machine is simplified, and, in the case of A.C. operation, the rotor speed need not be closely controlled in order to maintain an accurate hertz value.

The term bipolar stator structure, then, denotes, in a mechanistic sense, a particular broad class of stator constructions without regard to the character of the energizing potential and the resultant magnetization. In terms of magnetic circuitry, however, bipolar machine is construed as inclusive of a D.C. magnetically homo-polar machine and an A.C. magnetically bipolar machine. The mechanical construction in either of these cases can be essentially the same. The commutatorless mode of operation is similar except that an A.C. field excitation produces and A.C. output while a pure D.C. excitation produces an acyclic output in the generator mode of operation.

In accordance with this invention, the rotor assembly is provided with a multiplicity of electric current conducting coils that are supported for revolution in the bipolar magnetic field by a rotor structure which distorts the magnetic field in a predetermined manner whereby only a portion of each coil will be effective in cutting lines of magnetic flux. The coils are formed and relatively positioned on the rotor structure to restrict current flow in those portions of the coils effective in cutting lines of magnetic flux to a common direction relative to the rotor assembly. As a consequence of the common direction of current flow in all coils, a multiplicity of coils may be serially connected with the terminals being brought out of the machine by a slip-ring assembly, thereby eliminating the commutator assembly necessary in conventional wound-rotor machines for either direct current or alternating current operation.

Futher aiding the objective of providing a non-commutating type rotary electric machine is the stator assembly of this invention. This stator assembly includes a stator structure which is of a bipolar construction that materially enhances the formation of the uniform or A.C. dipolar magnetic field, as desired for operation of this machine. The stator structure forms a magnetic circuit which, in cooperation with the novel rotor structure, provides an appropriately shaped or dipolar magnetic field.

Another important objective accomplished by this invention is the provision of a non-commutating rotary electric machine which is readily operable as either a motor or generator. In addition, the machine, when utilized as a generator, is not limited as to voltage output as a result of the capability of serially connecting the multiplicity of coils. Furthermore, the machine may be operated as either an alternating or direct current machine and, for an alternating current mode of operation, may be constructed for poly-phase operation.

These and other objects and advantages of the present invention will be readily apparent from the following description of an embodiment thereof and modifications thereto and the accompanying drawings.

Figure 1:
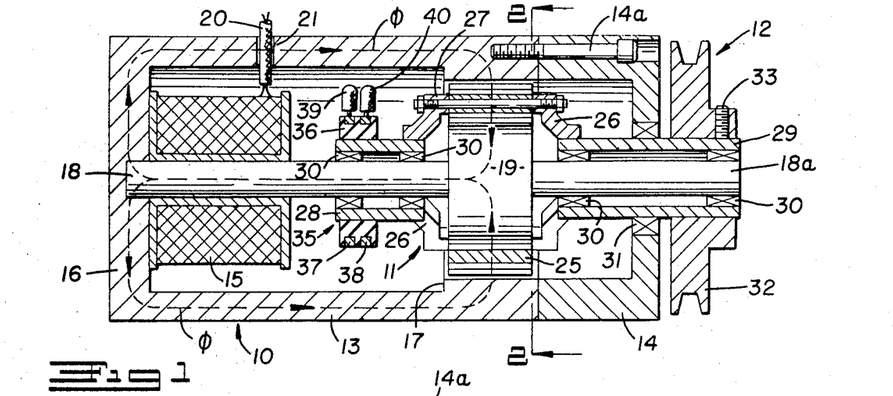
FIG. 1 is a medial, longitudinal sectional view of a rotary electric machine embodying this invention.

Having reference to the drawings and specifically to FIG. 1, a rotary electric machine constructed in accordance with this invention is illustrated by a medial, longitudinal, sectional view and is seen to comprise, in general, a stator assembly 10 and a rotor assembly 11. The illustrated machine may be utilized as either a motor or generator and may also be operated as either a direct current machine or an alternating current machine. As will be explained more fully hereinafter, the type and mode of operation will be dependent on the type of magnetic field developed within the stator assembly and whether the rotor assembly is connected to supply an output current or a current is supplied to the rotor. Providing a mechanical drive connection either to or from the machine illustrated in FIG. 1 is a pulley assembly 12 which is driving connected to the rotor assembly and is adapted to be connected to a suitable driving means or driving member by a V-belt type connection.

Forming the stator assembly 10 is a stator structure 13, an end bell housing 14 and magnetic-field-producing means 15. The stator structure 13 and the end bell housing 14 are structurally joined together by suitable fastening means, bolts 14a, for example, to form a rigid machine casing that may be readily mounted at a particular location by suitable mounting means (not shown). The particular mounting means for the stator assembly is not shown in FIG. 1 as such mounting means and techniques are well known to those familiar with the art. In the embodiment of the machine shown in FIG. 1, the stator structure 13 comprises an elongated, cylindrically shaped tube having an end wall 16 which may be integrally formed with the cylindrical wall. The opposite end of the stator structure 13 is formed with a reduced diameter portion forming a cylindrically surfaced pole piece 17. Also included in the stator assembly 10 is an elongated, cylindrical shaft 18 provided with a cylindrical disc of relatively larger diameter which forms a cylindrical pole piece 19. One end of the shaft 18 is inserted in a socket formed in the end wall 16 of the stator structure in coaxial relationship to the pole piece 17. The cylindrical pole piece 19 is fixed on the shaft 18 in coaxial relationship to the shaft 18 and to the surface of the pole piece 17 and is positioned in the space defined by the pole piece 17. Positioning of the pole piece 19 will thus form an annular, ring-shaped space or air gap relative to the surface of the pole piece 17. It is in this space that the rotor assembly 11 is positioned for revolution.

The magnetic-field-producing means 15 illustrated in FIG. 1 comprises an electric current-conducting coil which is mounted on the shaft 18 with this shaft extending through the center of the coil. An electrical cable 20 is connected to the two terminals of the magnetic field-producing coil and this cable is brought out through an aperture 21 formed in the side of the stator structure 13. A suitable source of electrical power (not shown) is connected to the cable for energizing the coil 15 to produce the necessary magnetic field. This power source may be either D.C. or A.C. as determined by the particular operating condition and, in the case of operation as a generator, the coil may be connected with the rotor assembly 11 for self-excitation.

By forming the stator structure 13, the shaft 18 and the pole piece 19 from a suitable, magnetically-conductive material, a magnetic circuit is formed for the magnetic field produced by the coil 15. This magnetic circuit includes the air gap which is formed by the opposing surfaces of the pole pieces 17 and 19. Energization of the coil 15 with a suitable electrical current, such as a direct current, will produce a magnetic field in the shaft 18 which essentially forms a core for the coil 15. As a consequence of the relatively low magnetic reluctance path formed by the magnetic circuit of the stator structure 13 and the pole piece 19 and shaft 18, the lines of magnetic flux will tend to flow in this magnetic circuit rather than by randomly distributed in the surrounding air space. This circulation of the magnetic field is diagrammatically illustrated by the directional indicating lines of magnetic flux superimposed on the structure shown in FIG. 1. As a consequence of this particular shape of the stator structure and pole piece 19, the lines of magnetic flux would tend to be uniformly distributed in a radial pattern within the space or air gap formed between the opposing surfaces of the pole pieces 17 and 19. This uniform, radial distribution pattern of the lines of magnetic flux is based on the assumption that the rotor assembly 12 is not disposed in magnetically-coupled relationship to the stator assembly 11. Thus, as will be readily seen from a consideration of the stator assembly 10, a magnetic field will be produced in the annular space between the pole pieces 17 and 19 which is known as a uniform magnetic field as the lines of magnetic flux will be unidirectional relative to the pole pieces 17 and 19 and radially aligned. Due to the existence of a relatively large space between the pole pieces 17 and 19, a given magnetic field intensity produced by the coil 15 will not provide a high magnetic field density in the space between the pole pieces. This magnetic field density may be increased through the insertion of a magnetically conductive material in this space which will materially reduce the reluctance as compared to an air space. The magnetic circuit formed by the stator structure 13, shaft 18 and pole piece 19 is not short-circuited by the end bell housing 14 attached to the open end of the stator structure by forming the end bell housing from a material which is magnetically non-conductive. Thus, the end bell housing will present a relatively high reluctance magnetic path and the lines of magnetic flux will tend to be distributed in the space between the pole pieces 17 ind 19. For example, a material such as aluminum may be utilized in the fabrication of the end bell housing 14 as this material is capable of exhibiting substatnial structural ragidity which is required to assist in supporting the shaft 18 on which the rotor assembly 11 is supported and revolved.

The rotor assembly 11 comprises a cylindrically-shaped rotor shell 25 which is supported for revolution within the air gap formed by the pole pieces 17 and 19 of the stator assembly 10. This rotor shell, which is preferably of a laminated construction formed from a number of relatively thin sheets of magnetically conductive material, is secured between a pair of end spiders 26 which may have three leg portions that engage the end surfaces of the rotor shell 25 and are secured thereto by three bolts 27 extending through the assembled structure. Formed with each end spider 26 is an elongated, tubular sleeve, 28 or 29, which is coaxially aligned with the rotor shell 25 and is journaled on suitable bearing structures 30 mounted on the shaft 18 and a shaft extension 18a. The tubular sleeve 29, along with the shaft extension 18a, projects through an aperture formed in the end wall of the bell housing 14 with the sleeve being journaled in a bearing structure 31 mounted in this aperture. Mechanical connection of the rotor assembly 11 through an associated driving or driven member (not shown) is effected by means of the pulley assembly 12. A pulley 32 for such a mechanical connection is shown mounted on the tubular sleeve 29 externally of the end bell housing 14. The pulley 32 is illustrated as being of the V-belt type and is secured to the tubular sleeve 29 by a setscrew 33.

The rotor assembly 11 is provided with a number of current-conducting coils or windings which will be described in further detail hereinafter and an electrical connection to these coils is effected by means of a slip ring structure 35. Such a slip ring structure 35 may include an electrically insulating base ring 36 and two electrically conductive slip rings 37 and 38. Two brush assemblies 39 and 40 are supported by the stator structure 13 to form an electrical contact with slip rings, 37 and 38. The slip ring structure 35, as can be best seen in FIG. 1, may be supported on the tubular sleeve 28 with the brush assemblies 39 and 40 each having an electrical terminal brought out to the exterior of the stator structure 13 for connection with an external electrical circuit.

Figure 2:
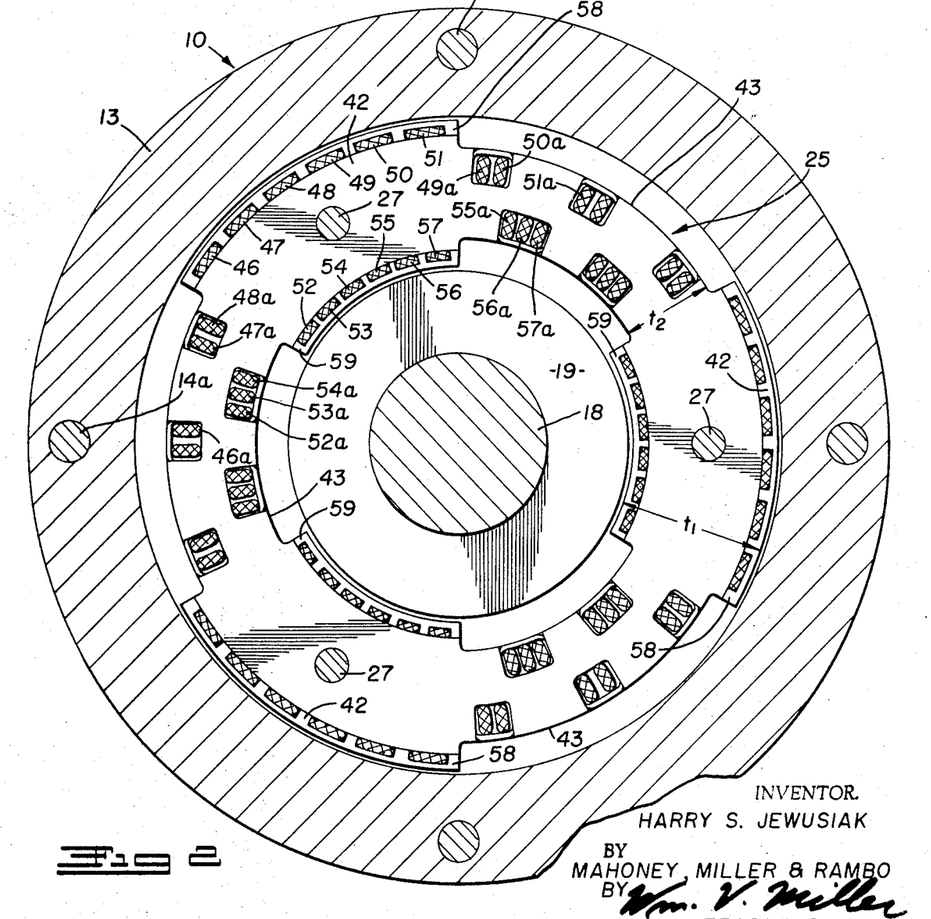
FIG. 2 is a vertical sectional view taken along line 2—2 of FIG. 1.

Having reference to FIG. 2, the cylindrical rotor shell 25 is seen to be formed with six segmental, cylindrical wall areas with the adjacently disposed segments being of different wall thicknesses. The three thicker segmental portions of the rotor shell are designated by the numeral 42 and have a wall thickness $t_1$ which provides an air gap between the cylindrical surfaced pole pieces 17 and 19 with the resultant air gap between the opposed peripheral surfaces of the segments 42 and the adjacent pole pieces 17 and 19 being maintained at a minimal value which will provide adequate space for the current conducting coils or windings with appropriate clearance between the opposed surfaces during revolution of the rotor assembly 11. The three relatively thinner segmental portions of the rotor shell, designated by the numeral 43, have a cylindrical wall thickness $t_2$ substantially less than that of the segments 42 with the segments 43 being symmetrically disposed relative to the peripheral surfaces of the thicker segment 42. The peripheral surfaces of the segmental portions 43 are thus disposed at a relatively greater distance from an opposed surface of either the cylindrically surfaced pole piece 17 or the periphery of the pole piece 19. The relative difference in the thicknesses $t_1$ and $t_2$ are such that the resultant effective air gap associated with the thinner segmental portions 43 will be of a length such that the magnetic reluctance of this portion of the air gap will be relatively large. Consequently, the density of the magnetic field between the pole pieces 17 and 19 will be relatively high within the space defined by the thicker segmental portions 42 as the magnetic reluctance of the magnetic circuit formed in the region associated with the thinner segmental portions 43. The number of segmental portions 42 and 43 forming the rotor shell 25 in the present embodiment is to be considered as illustrative and not a limitation as the number of segments, either 42 or 43, may be varied as may be best determined for a particular construction of rotary electric machine.

As previously indicated, the rotor shell 25 is provided with an electrical current conducting winding comprising a number of multiple-conductor, closed-loop coils which are arranged on the rotor shell in such a manner that the current-carrying conductors which are effectively magnetically coupled with the lines of magnetic flux extending through the thicker segmental portions 42 will conduct electrical current in the same relative direction. Again referring specifically to FIG. 2, each of the thicker segmental portions 42 is shown provided with segments of six closed loop coils which are designated by the numerals 46 through 51 with an associated segment of each coil designated by a similar number with the subscript $a$ disposed in a space associated with the segmental rotor shell portion 43. Each of the respective pairs of coil segments, such as 46 and 46a, extend axially along the rotor shell with the adjacent ends interconnected to form a closed loop with the closed loop coils being serially connected with the two resultant terminals being connected to the slip ring structure 35. The coils thus disposed about the outer periphery of the cylindrical rotor shell 25 form a single continuous electrical conductor. The coil segments 46–51 which are distributed about the outer peripheral surface of the rotor segment 42 are retained in their proper positions by a suitable retainer 58 formed from a non-magnetic material. The retainer 58 in turn is secured to the rotor shell 25 to prevent radial and circumferential displacement of the coil segments 46–51. Axially extending slots are formed in the outer peripheral surface portions of the segments 43 of the rotor shell 25 to receive respective coil segments 46a–51a with each of the slots preferably formed or provided with coil-retaining means such as is well known in the art.

A second winding comprising a number of closed loop coils is formed on the inner peripheral wall of the rotor shell 25 which is constructed in a manner similar to that formed on the outer periphery. The coil segments of the second winding distributed over the inner wall portions of one of the rotor segments 42 are designated by the numerals 52 through 57 with the associated coil segments disposed in slots formed in the inner peripheral surface portions of the rotor shell segments 43, being designated by similar numerals with the subscript $a$. A non-magnetic coil retainer 59 of suitable configuration is also provided adjacent the inner peripheral surfaces of each of the segments 42 and is secured to the rotor shell 25 to maintain the coil segments 52–57 in their proper positions. This second winding may be connected in series or in parallel with the first winding formed on the outer periphery of the rotor shell 25 or this winding may be connected to a second set of slip rings (not shown) having an independent external connection.

Figure 3:
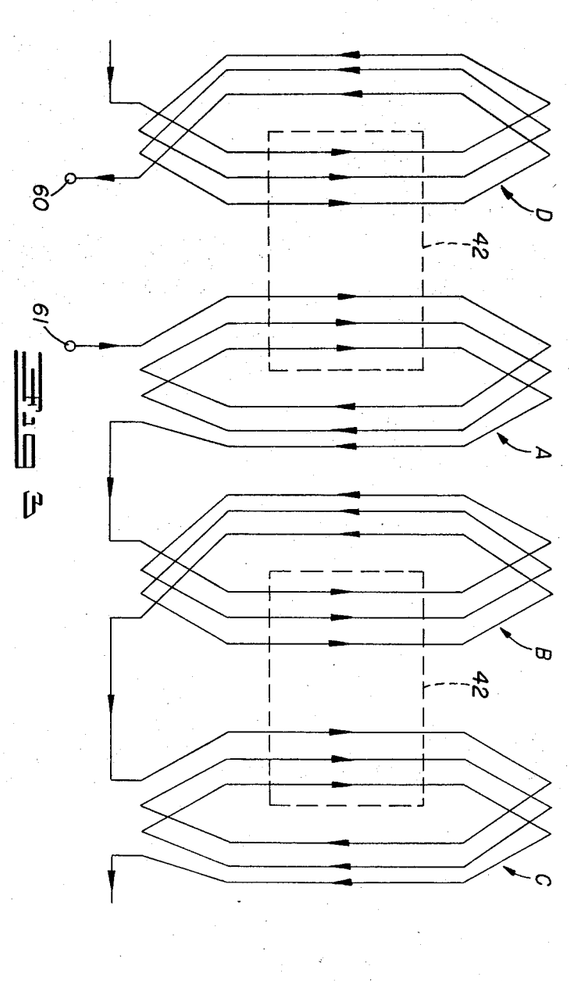
FIG. 3 is a diagrammatic representation of a rotor winding.
Figure 4:
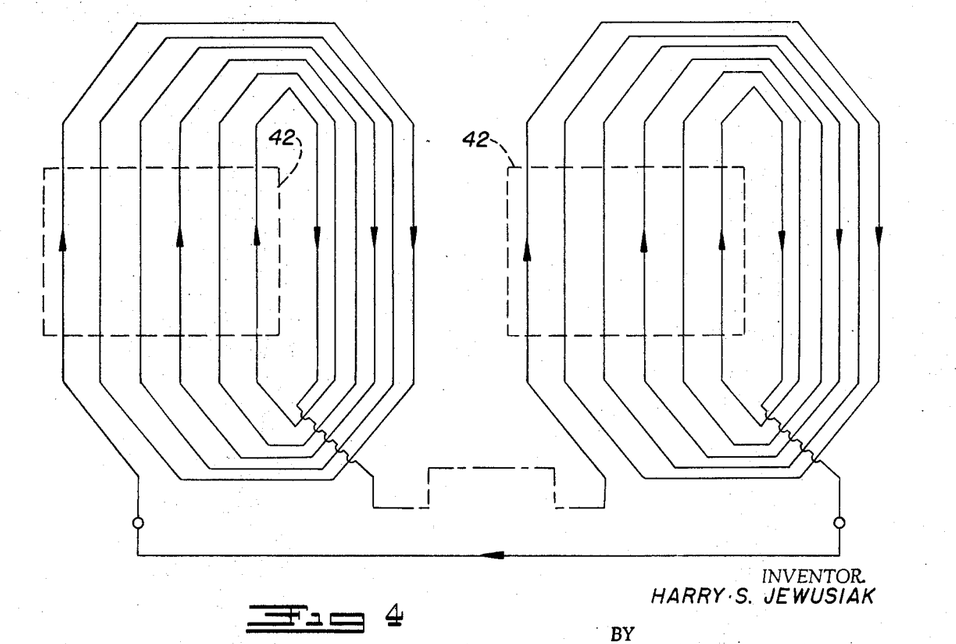
FIG. 4 is a diagrammatic representation of a rotor winding of alternative form.

Specific winding arrangements are diagrammatically illustrated in FIGS. 3 and 4 in which the segmental rotor shell portions 42 are indicated by the broken line rectangles and the closed loop coils are illustrated by single lines. It is to be understood that although the coils are shown by a single line that each of the coil segments comprises a multiplicity of conductors, as may be determined necessary by the particular design considerations which include such factors as current-carrying capacity and voltage output. It is also to be understood that the winding will be continued between the end coils shown in FIGS. 3 and 4 for the third segmental rotor shell portion 42 which will be of the same configuration. All of the coils or windings are serially connected and, as can be seen from this diagram, the current flow through any segment associated with a rotor shell segmental portion 42 will be in the same relative direction. Consequently, with unidirectional current flow in the windings of the rotor assembly, the windings may be connected to two output terminals designated 60 and 61 and which terminals may be electrically connected to the slip rings 37 and 38 of the slip ring structure 35. Thus, only one slip ring structure 35 will be required for operation of this rotary electric machine. Although only a serial coil connection is illustrated herein, it is to be understood that a particular winding may include parallel connected coils.

Operation of the rotary electric machine of this invention, either as a motor or a generator, does not result in a reversal in the direction of current flow through the a reversal in the direction of current flowthrough the current-carrying conductors of the coils formed on the rotor assembly 11 or a reversal in the motor torque as no reversal of magnetic field is seen by the coil segments. The magnetic field, which is produced between the opposed surfaces of the pole pieces 17 and 19, will not be effective as to the coil segments which are formed in the slots of the relatively thin segmental portions 43 of the rotor shell 25. The relatively greater air gap or space between the surfaces of these portions of the rotor shell will substantially prevent the lines of magnetic flux from traversing this space. As a result, the lines of magnetic flux will be effective only as to the conductors which are carried or formed on the segmental portions 42 as the air gap associated with these portions is relatively small and results in a magnetic circuit with minimal reluctance. Revolution of the rotor assembly 11 resulting in revolving of the rotor shell 25 will cause the conductors formed on the thick segmental portions 42 to cut the lines of magnetic flux and thus generate an electrical current or induced electromotive force. The current thus flowing through these conductors, such as 46 through 51, will also flow in the respective associated coil segments 46a through 51a. This current flow through the segments 46a through 51a is in opposition to a current flow resulting from an E.M.F. induced in the coil segments 46a through 51a when these coil segments are effectively cutting lines of magnetic flux. However, the magnetic flux density at this location is negligible and the coil segments 46a–51a will not generate an electrical current or have an induced electromotive force of significance. The same situation prevails in the case of the machine being utilized as an electric motor. In that case, an electric current is caused to flow through the coils of the rotor winding and results in revolution of the rotor assembly 11. A motoring torque will be produced by the coil segments 46a–51a but this torque is negligible due to the relatively low magnetic flux density in this region.

When operated as a generator, utilization of a D.C. magnetic field results in a D.C. electric current output while utilization of an A.C. magnetic field results in an A.C. electric current output. In the A.C. mode of operation, the frequency of the output is dependent on the frequency of the magnetic field and not the speed at which the rotor assembly is revolved as the magnetic field will be pulsating uniformly throughout the air gap and is not a spatially varying magnetic field. The output voltage, in the case of a D.C. generator, is dependent only on the rotor speed with the voltage being variable in direct proportion to the rotor speed. In the case of an A.C. generator, this rotor speed relationship to output voltage also exists, but, in addition, there is an induced E.M.F. resulting from flux linkage change which is either additive or subtractive depending on the direction of rotation. This factor of frequency independence as to rotor speed is of particular advantage in instances where a constant frequency is desired.

Referring to the winding diagram of FIG. 3, it will be noted that the direction of the circulatory currents in adjacent groups of coils are relatively opposite. For example, if the electrical current which may circulate in a clockwise direction in the coil designated A, the current will circulate in a counterclockwise direction in the coil designated B. Similarly, there will be a clockwise current circulation in coil C and a counterclockwise current circulation in coil D. The resultant effect of the opposed magnetic fields produced by any two adjacent coil groups are self-canceling as to the machine but not as to each respective coil and this effect will be of no consequence for operation of the machine as either a motor or generator in either a D.C. or A.C. electric circuit with the exception of operation as an A.C. induction motor. For an A.C. induction motor, the rotor winding may be modified to follow the configuration shown in FIG. 4. The circulating currents in each group of coils in this winding configuration will be in the same direction, clockwise for example, and will produce a uniform opposing magnetic field. For an induction motor winding, the two output terminals of the winding may be connected to a suitable, known network (not shown) for adjusting the voltage-current phase relationship in the rotor.

Figure 5:
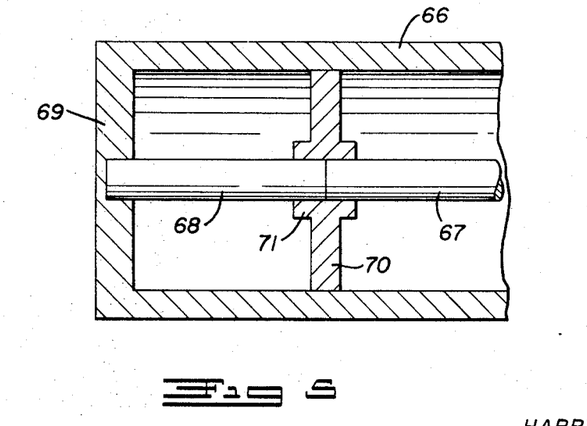
FIG. 5 is a fragmentary sectional view similar to FIG. 1 of a rotary electric machine provided with magnetic field generating means of the permanent-magnet-type.

A modification of the structure illustrated in FIGS. 1 and 2 is shown in FIG. 5. The modification shown comprises omission of an electromagnetic type magnetic-field-producing means 15 and the substitution therefor of a permanent magnet which will be effective in producing the necessary magnetic field. Having reference to FIG. 5, this modified structure includes a stator structure 66 similar to the previously described stator structure, an elongated cylindrical shaft 67 and magnetic field producing means 68. The stator structure 66 may also be a cylindrically shaped tube having an integrally formed end wall 69. The opposite end of the stator structure 66 will be formed as illustrated in FIG. 1 with the rotor assembly and end bell housing provided being similar to that previously illustrated and described in conjunction with FIG. 1. In this modified form, the shaft 67, which supports a pole piece similar to that designated 19 in FIG. 1, terminates at a distance from the end wall 69 with this end being supported in coaxial relationship to the cylindrical portion of the stator structure 66 by a support plate 70. The support plate 70 is secured in fixed relationship to the stator structure 66 and is formed with a central hub portion 71 having an axial bore into which the shaft 67 extends. Forming the magnetic field producing means 68 is a permanently magnetized device which may be in the form of an elongated cylindrical shaft having a magnetic field strength adequate for operation of the particular rotary machine. The magnetic device 68 extends between the shaft 67 and the end wall 69 in coaxial alignment with the shaft 67. One end of the magnetic device 68 extends into the bore formed in the central hub of the support plate 70 while the other end is disposed in a socket formed in the end wall 69 with the magnetic device being in contacting engagement with the end of the shaft 67 and with the end wall 69 to prevent formation of an air gap that would increase the reluctance of the magnetic circuit. The stator structure 66 and the shaft 67 are formed from a magnetically conducting material whereby the magnetic device 68 will be effective in inducing a magnetic field in a magnetic circuit formed by the magnetic device 68, the cylindrical shell of the stator structure 66, the air gap formed between the opposed pole pieces 17 and 19 and the shaft 67. To avoid short-circuiting this magnetic circuit, the support plate 70 is formed from a material having a high magnetic reluctance and will thus prevent the magnetic flux from returning to the magnetic device 68 without first passing through the air gap formed between the pole pieces 17 and 19 and a rotor assembly 11 which may be disposed between the pole pieces.

Figure 6:
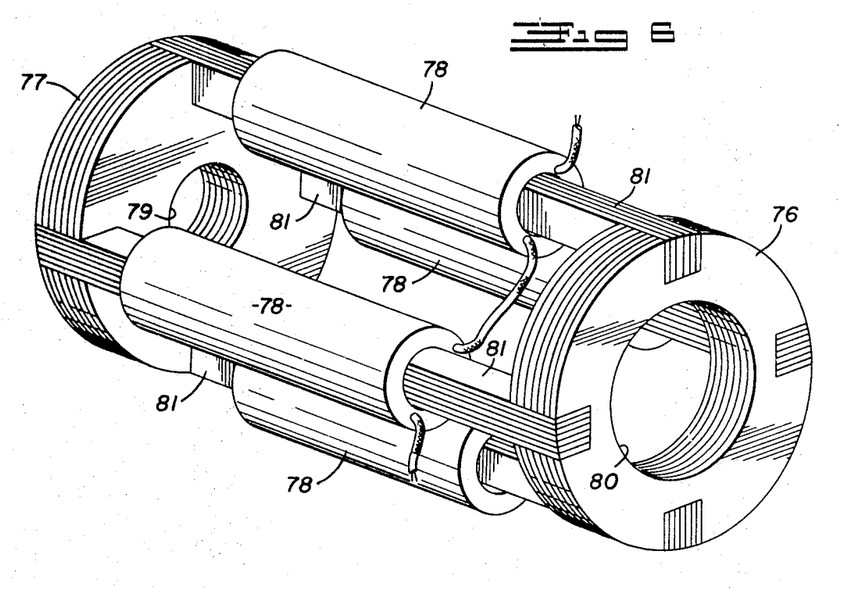
FIG. 6 is a perspective view of a modified stator structure provided with electromagnetic magnetic field producing means.

Another modification of the apparatus is shown in FIG. 6. A modified stator assembly 75 is shown in FIG. 6 and is adapted to be utilized with the rotor assembly 11 illustrated and described in conjunction with the apparatus shown in FIG. 1. This modified stator assembly 75 comprises a pole piece 76 of annular disc form, an end wall 77 and a plurality of magnetic field producing means 78. The end wall 77 is also of annularly-shaped disc-form, having a central coaxially disposed aperture 79 for receiving the end of a shaft similar to that designated 18 in FIG. 1 and supporting the cylindrical pole piece 19. The aperture 79 is adapted to receive the end of such a shaft and secure the shaft in rigid relationship thereto. The pole piece 76 is formed with the central coaxial aperture 80 which forms the surface of this pole piece and is opposed to the surface of a pole piece such as is designated 19 in FIG. 1.

Each of the magnetic field producing means 78 is mounted on an elongated bar 81 which extends between and is secured to the pole piece 76 and end wall 77 forming a rigid stator structure. The magnetic field producing means 78 comprise electromagnetic coils which are preferably serially connected to a suitable source of electrical power. This type of construction reduces the size of the electromagnetic coils required to produce the specific magnetic field for operation of the rotary electric machine, as compared to the structure illustrated in FIG. 1. Preferably, the elongated bars 81, end wall 77 and pole piece 76 are of laminated construction, and may be formed from suitable given oriented materials, to further enhance efficiency of operation.

The rotary electric machines illustrated in FIGS. 1 through 6, inclusive, and described hereinbefore, are designed for utilization of either a direct current or single-phase alternating current power. The apparatus of this invention may also be readily adapted for utilization in three-phase alternating current circuits with two embodiments of three-phase apparatus being illustrated in FIGS. 7 and 8. Having reference, specifically, to FIG. 7, an embodiment of a three-phase machine constructed substantialy with the same basic components as the single-phase or D.C. machine of FIG. 1, is seen to comprise a stator assembly 85 and a rotor assembly 86 which is supported for revolution within the stator assembly. The stator assembly includes a stator structure 87 of cylindrical shape formed from a magnetically-conductive material. Formed on the inner cylindrical surface of the stator structure 87 in axially spaced relationship are three annularly shaped pole pieces 88, 89 and 90. These pole pieces may be integrally formed with the cylindrical shell of the stator structor and have inner peripheral surfaces which are coaxially aligned. Adapted to be secured to each end of the open-ended stator structure 87 are two end bell housings 91 and 92. In the illustrated embodiment, both housings 91 and 92 are formed with an annular flange, 91a and 92a, which mates with a similar flange, 87a and 87b, respectively, formed on an adjacent end of the stator structure 87 and the housings are secured to the structure by several bolts 93. Fitted in an aperture formed in the wall of the end bell housing 91 is an elongated, tubular shaft 94 which extends coaxially through the stator structure 87 and projects through an aperture 95 formed in the end wall of the housing 92. Mounted on the tubular shaft 94 are three pole pieces 96, 97 and 98 which are cylindrically shaped. Each pole piece 96, 97 and 98 is positioned on the tubular shaft in a fixed position in radially aligned relationship to a respective one of the pole pieces 88, 89 and 90 formed with the stator structure 87. In this embodiment of the apparatus, the magnetic circuit is formed in the stator structure 87 and the tubular shaft 94, in conjunction with the pole pieces 96, 97 and 98, and accordingly, only these elements are formed from a magnetically conductive material. The end bell housings 91 and 92 are preferably formed from a nonmagnetically conducting material and thus the magnetic circuit is limited to the foregoing elements.

Figure 7:
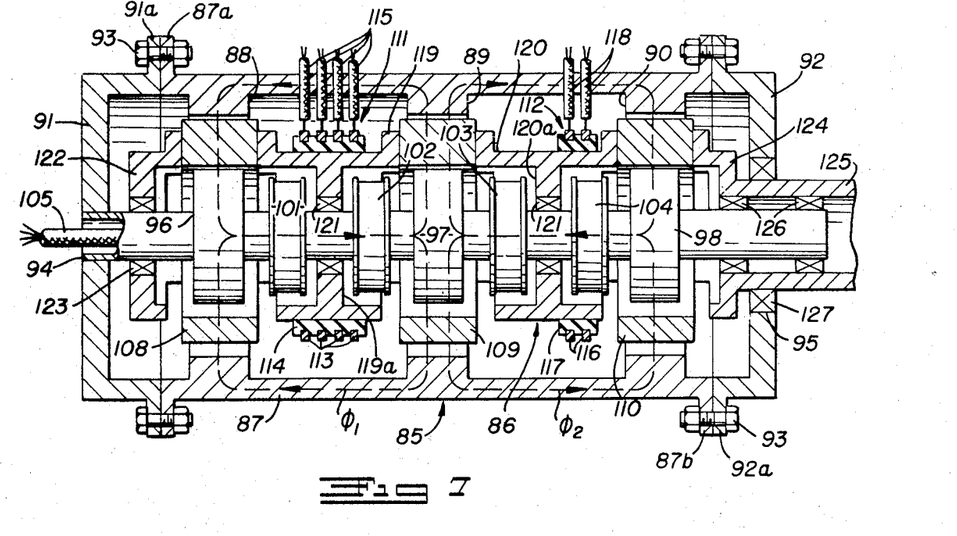
FIG. 7 is a medial, longitudinal sectional view of a poly-phase rotary electric machine embodying this invention.

Also included in the stator assembly 85 are magnetic field-producing means which may include the electromagnetic coils 101, 102, 103, and 104. These coils are mounted on the tubular shaft 94 in axially spaced pairs betwen the pole pieces 96, 97 and 97, 98. Each pair of the electromagnetic coils, such as 101, 102 and 103, 104, form a single phase of the electrical circuit and are connected to an external three-phase, power supply which may have two phases connected in an open V-network to supply the necessary power. Electrical connection of the electromagnetic coils 101 through 104 with a suitable electrical power source may be conveniently effected by bringing the connecting leads through the hollow, tubular shaft 94. A four-wire cable 105 is shown in FIG. 7 for connection with the electromagnetic coils. Magnetic circuits are thus formed for the three phases of the machine and energization of the electromagnetic coils through connection to a three-phase alternating current power source and result in inducement of the magnetic lines of flux indicated as phases $\phi_1$ and $\phi_2$. As can be best seen by reference to FIG. 7, the magnetic flux resulting from phase $\phi_1$ of the electromagnetic circuit is predominant in the air gap formed by the pole pieces 88 and 96 and the magnetic flux resulting from phase $\phi_2$ is predominant in the air gap formed betwen the pole pieces 90 and 98. The magnetic flux developed by both phases will be present in the air gap formed by the pole pieces 89 and 97; however, in the three-phase circuit, the phases are electrically displaced 120° and the resultant is the third phase for the electrical and magnetic circuits.

Mounted for revolution within the central portion of the stator structure 87 is a rotor assembly 86. Included in this rotor assembly 86 are three cylindrical rotor shells 108, 109 and 110 which are of the same general construction as the rotor shell 25, illustrated in FIG. 1. Each of the rotor shells 108, 109 or 110 may be formed with the three segmental portions which are of a relatively greater thickness than three intermediate wall sections. Also, the rotor shells are provided with a winding, such as is shown in conjunction with FIGS. 2 and 3, or a variation of the winding as is shown in FIG. 4. The terminals of these windings are attached to slip ring structures 111 and 112. The slip ring structure 111 is provided with four slip rings 113 of electrically conductive material mounted on a base ring 114 formed from an electrically insulating material. Two of the slip rings 113 are connected to the terminals of the winding formed on the rotor shell 108 while the other two slip rings are connected to the winding formed on the rotor shell 109. Similarly constructed brush assemblies 115 are supported by the stator structure 87 for electrical contact with the respective slip rings 113 with the brush assemblies adapted for connection within an external electrical circuit. The slip ring structure 112 includes two electrically conducting slip rings 116 which are mounted on an electrically insulating base ring 117. The rotor winding formed on the rotor shell 110 is connected to the slip rings 116 and a connection to an external electrical circuit may be effected by the brush assemblies 118 which are also supported by the stator structure 87.

Disposed between and interconnecting the pairs of rotor shells 108, 109 and 110 are a pair of spacers 119 and 120 which are formed from a nonmagnetically conducting material. Each of the spacers may be of a construction to facilitate bolting or other fastening of the spacer to the respective rotor shells 108, 109 and 110 with the slip ring structures 111 and 112 mounted on the external surfaces of the respective spacers 119 and 120. Each of the spacers 119 and 120 may be formed with an internal, radially disposed flange 119a and 120a having a central aperture, and having a bearing assembly 121 disposed in the central aperture of each for support of the spacer on the tubular shaft 94. Attached to the rotor shell 108 is a spider shell 122 having a bearing assembly 123 mounted on the shaft 94 to assist in support of the rotor assembly. A spider shell 124 is also secured to the outboard side of the rotor 110; however, this spider shell is formed with an elongated tubular extension 125 which extends coaxially relative to the tubular shaft 94. A pair of bearing assemblies 126 may be interposed between the tubular shaft 94 and the tubular extension 125 of the spider shell 124 with the tubular extension 125 disposed in a bearing 127 mounted in the aperture 95 of the end bell housing 92. The spider shell extension 125 projects a distance from the end bell housing 92 to facilitate mechanical connection thereof to a driven or driving apparatus.

Connection of the electromagnetic coils 101 through 104 to a suitable three-phase alternating current power source will provide the necessary magnetic field for operation of the three-phase rotary electric machine allustrated in FIG. 7. The magnetic fields thus induced will extend through the stator structure 87 and the pole pieces 96, 97 and 98 with the lines of magnetic flux in each of the pairs of poles being electrically displaced 120° assuming that the electrical power supply is also of the three-phase type having a 120° electrical displacement. The operation of the machine in either generating electric current or functioning as an electric motor will be as previously described in conjunction with the single phase or D.C. machine illustrated in FIG. 1.

Figure 8:
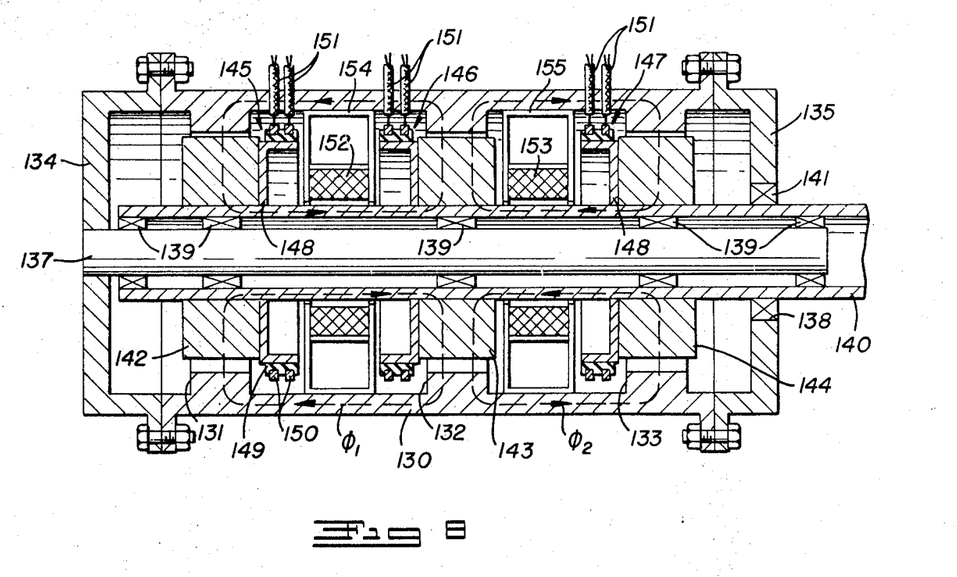
FIG. 8 is a medial, longitudinal sectional view of a modified poly-phase rotary electric machine embodying this invention in which the number of air gaps in the magnetic circuit is reduced.

A modification of the three-phase machine of FIG. 7 is shown in FIG. 8. This three-phase machine also includes a cylindrically shaped stator structure 130 having three axially spaced, inwardly directed annualr pole pieces 131, 132 and 133. End bell housings 134 and 135 are secured to the stator structure 130 by suitable means, such as flange and bolt connections illustrated and described in conjunction with the modification shown in FIG. 7. Extending through the stator structure 130 in coaxial relationship therewith is an elongated shaft 137 having one end supported in a socket formed in the end wall of the bell housing 134 with the other end of the shaft projecting through an enlarged aperture 138 formed in the end wall of the bell housing 135. Mounted on the shaft 137 by suitable bearing assemblies 139 is a tubular shaft 140 which extends substantially the length of the stator structure 130 and projects a distance outwardly therefrom for connection with an external driving or driven mechanism. A bearing 141 mounted in the aperture 138 provides support for the tubular shaft 140. Fixedly mounted on the tubular shaft 140 are three cylindrically-shaped pole pieces 142, 143 and 144. Each pole piece 142, 143 and 144 is radially aligned with the respective one of pole pieces 131, 132 and 133 formed on the inner wall of the stator structure 130. The magnetic circuit for the apparatus illustrated in FIG. 8 is formed by the stator structure 130, the tubular shaft 140 and the pole pieces 142, 143 and 144, and accordingly, these elements are formed from a suitable magnetically conductive material.

Each of the pole pieces 142, 143 and 144 are of a configuration wherein the outer peripheral cylindrical surface is formed in a manner similar to that illustrated in detail with the rotor shell 25 shown in FIG. 2, that is, each of the pole pieces forms a rotor shell which may have the three segments, which are of relatively greater diameter, separated by three segments of a relatively smaller diameter, with the consequent difference in air gap preventing effectiveness of the magnetic lines of flux with relationship to the winding or coil segments carried by the smaller diameter segments. Each of the pole pieces 142, 143 and 144 is also provided with a suitable rotor winding which may be formed as previously described in conjunction with FIG. 2, 3 or 4.

Associated with each of the rotor shells 142, 143 and 144 is a slip ring structure 145, 146 and 147. Each of the slip ring structures includes a mounting bracket 148 secured to the respective rotor shell and carrying an electrically insulating base ring 149 provided with two electrically conducting slip rings 150. A pair of brush assemblies 151 are provided for each of the slip ring structures to permit connection of the windings of each of the rotor shells with an external electrical circuit.

Two electromagnetic coils 152 and 153 are provided to produce the required three-phase magnetic fields with each coil being disposed between a pair of the pole pieces. Each of the coils 152 and 153 is connected to a phase of a suitable three-phase alternating current power source having a phase relationship of 120°. Thus, the magnetic field induced in the stator structure and the rotor shells will also be of the three-phase type as previously described in conjunction with the apparatus shown in FIG. 7. Each of the electromagnetic coils 152 and 153 is supported in a respective housing 154 and 155 carried by the stator structure 130.

Figure 9:
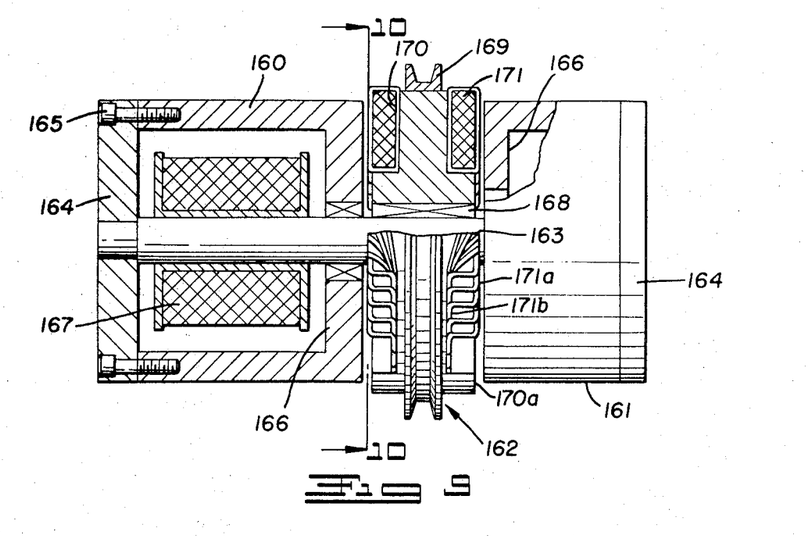
FIG. 9 is a longitudinal view partially in section of an axial air gap rotary electric machine embodying this invention.
Figure 10:
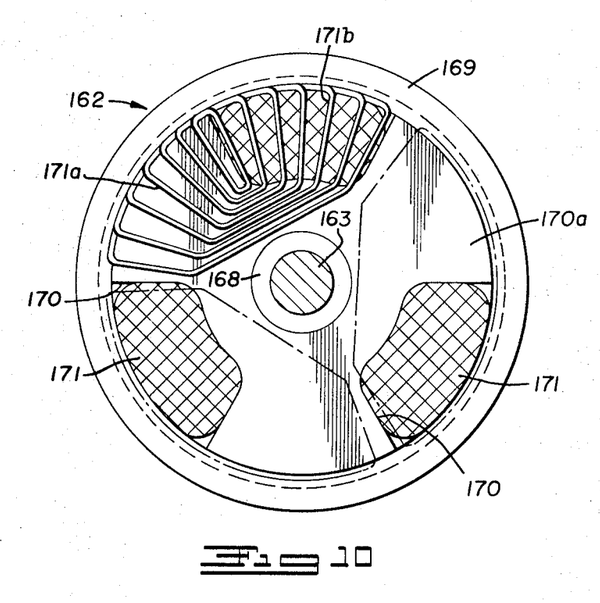
FIG. 10 is a transverse sectional view taken along line 10—10 of FIG. 9.

The commutatorless rotary electric machines previously described are all of the radial air gap type but this invention is not limited to this type of structure. This is illustrated by the apparatus shown in FIGS. 9 and 10 which is of the type defined as an axial air gap machine. Referring to FIG. 9 which is a partially sectioned side elevational view, it can be seen that this machine comprises two cylindrical stator shells 160 and 161 disposed in coaxially aligned, spaced apart relationship and a rotor assembly 162 coaxially supported between the two stator shells for revolution about the same axis. Interconnecting the two stator shells 160, 161 is an elongated cylindrical shaft 163 formed from a material of low magnetic reluctance as are the stator shells and thus forms an integral, low reluctance magnetic circuit. Each of the stator shells 160, 161 is preferably formed in two sections to facilitate assembly and includes the cylindrical main body which is closed at one end by a plate 164 which is secured to the main body by suitable fastening means such as bolts 165 and has a central aperture for receiving a shouldered end of the shaft 163 in fixed relationship. The adjacent ends of the stator shells 160, 161 are each formed with respective pole pieces 166 which may be integrally formed, inwardly projecting, annular rings. Positioned on the shaft 163 within each of the stator shells is a magnetizing coil 167 which when connected to a suitable source of electric power (not shown) and energized generate a magnetic field having lines of magnetic flux that flow through the shaft 163, the stator shells 160, 161 and across the air gap between the opposed surfaces of the pole pieces 166. The pole pieces 166 thus define an axial air gap which is characteristic of this form of the machine.

The rotor assembly 162 which is formed from a material having a characteristic low reluctance is mounted on the shaft 163 by a suitable bearing structure 168. Mechanical coupling of the rotor assembly to either a driving means in the case of a genator or a driven apparatus (neither of which is shown) may be accomplished through a belt connection with the rotor assembly being provided with a peripheral pulley 169. Both sides of the rotor assembly main body structure are formed with segmental recesses 170 as can be best seen in FIG. 10 and rotor coils 171 are distributed around the radial face with coil segments 171a and 171b being positioned alternatingly and respectively on the outer radial face 170a and in the recesses 170b. This results in a coil arrangement similar to that previously described in conjunction with the radial gap machines where one segment of each coil is in a low reluctance magnetic circuit while the other segment of each coil is in a high reluctance magnetic circuit and only the segments in the low reluctance circuit will be effective in cutting lines of flux since the magnetic flux lines between the pole faces 166 will follow the lowest reluctance magnetic circuit. Suitable coil retaining means as well as slip rings (neither of which are shown) would also be provided to complete the rotor assembly.

The utilization of the commutatorless rotary electric machine of this invention has been described in general terms with reference to operation as a motor or as a generator. The machine may also be constructed to function as an electric rotary converter. For example, the machine illustrated in FIG. 1 may have the winding formed on the outer periphery of the rotor shell 25 connected to an external circuit and function as generator while the winding formed on the inner periphery of the rotor shell may be constructed as an induction motor winding if an A.C. field is used, or as a D.C. motor winding if a D.C. field is used as in FIG. 4.

It is readily apparent from the foregoing description that a commutatorless rotary electric machine is provided which accomplishes the objective of eliminating the requirement for a commutator for a wound rotor. A number of bipolar stator portions can be phase-displaced for essentially similar operating characteristics. The machine may be utilized for either D.C. or A.C. operation with the frequency being independent of rotor speed in A.C. operation.

Having thus described this invention, what is claimed is:

1. A rotary electric machine comprising a stator assembly including a stator structure forming a magnetic circuit and defining a central air gap space of elongated toroidal shape and magnetic-field-producing means supported in magnetically coupled relationship to said stator structure to produce a magnetic field in said air gap space, a rotor assembly including a rotor structure rotatably supported in said air gap space for revolution about an axis aligned with a longitudinal axis of said air gap space, said rotor structure being formed with at least one magnetically-conductive, segmental portion forming a relatively low reluctance magnetic circuit in said air gap space resulting in a region of relatively higher magnetic flux density in the peripheral surface area of said segmental rotor portion and at least one electric current conducting coil carried by said rotor structure, said coil having two segments extending axially relative to the axis of revolution of said rotor structure with only one of said coil segments disposed within the region of relatively high magnetic flux density defined by said segmental rotor portion, said rotor assembly including at least one other electric current conducting coil having two segments, only one of which is disposed within the region of relatively high magnetic flux density, said coil being serially connected with current flow through the respective segments disposed within the region of relatively high magnetic flux density being in the same relative direction with the two coils disposed to provide relatively opposite circulatory current paths.

2. A rotary electric machine comprising a stator assembly including a stator structure forming a magnetic circuit and defining a central air gap space of elongated toroidal shape and magnetic-field-producing means supported in magnetically coupled relationship to said stator structure to produce a magnetic field in said air gap space, a rotor assembly including a rotor structure rotatably supported in said air gap space for revolution about an axis aligned with the longitudinal axis of said air gap space, said rotor structure being formed with at least one magnetically-conductive, segmental portion forming a relatively low reluctance magnetic circuit in said air gap space resulting in a region of relatively higher magnetic flux density in the peripheral surface area of said segmental rotor portion and at least one electric current conducting coil carried by said rotor structure, said coil having two segments extending axially relative to the axis of revolution of said rotor structure with only one of said coil segments disposed within the region of relatively high magnetic flux density defined by said segmental rotor portion, said rotor assembly including at least two serially connected coils which are disposed to provide circulatory current paths which are in the same relative direction.

3. A rotary electric machine comprising a stator assembly including a stator structure forming a magnetic circuit and defining a central air gap space of elongated toroidal shape and magnetic-field-producing means supported in magnetically coupled relationship to said stator structure to produce a magnetic field in said air gap space, a rotor assembly including a rotor structure rotatably supported in said air gap space for revolution about an axis aligned with the longitudinal axis of said air gap space, said rotor structure being formed with at least one magnetically-conductive, segmental portion forming a relatively low reluctance magnetic circuit in said air gap space resulting in a region of relatively higher magnetic flux density in the peripheral surface area of said segmental rotor portion and at least one electric current conducting coil carried by said rotor structure, said coil having two segments extending axially relative to the axis of revolution of said rotor structure with only one of said coil segments disposed within the region of relatively high magnetic flux density defined by said segmental rotor portion, said rotor assembly including at least two coils which are electrically separate.

4. A rotary electric machine comprising a stator assembly including a stator structure forming a magnetic circuit and defining a central air gap space of elongated toroidal shape and magnetic-field-producing means supported in magnetically coupled relationship to said stator structure to produce a magnetic field in said air gap space, a rotor assembly including a rotor structure rotatably supported in said air gap space for revolution about an axis aligned with the longitudinal axis of said air gap space, said rotor structure being formed with at least one magnetically-conductive, segmental portion forming a relatively low reluctance magnetic circuit in said air gap space resulting in a region of relatively higher magnetic flux density in the peripheral surface area of said segmental rotor portion and at least one electric current conducting coil carried by said rotor structure, said coil having two segments extending axially relative to the axis of revolution of said rotor structure with only one of said coil segments disposed within the region of relatively high magnetic flux density defined by said segmental rotor portion, said stator structure being formed with a plurality of pole piece surfaces, said magnetic-field-producing means including a plurality of electromagnetic devices magnetically coupled with said stator structure and operative to form at least two phase-displaced magnetic fields relative to two of said pole-piece surfaces, and said rotor assembly including a rotor structure revolvable in magnetically coupled association with each one of said pole-piece surfaces.

5. A rotary electric machine comprising a stator assembly including a stator structure forming a magnetic circuit and defining a central air gap space of elongated toroidal shape and magnetic-field-producing means supported in magnetically coupled relationship to said stator structure to produce a magnetic field in said air gap space, a rotor assembly including a rotor structure rotatably supported in said air gap space for revolution about an axis aligned with the longitudinal axis of said air gap space, said rotor structure being formed with at least one magnetically-conductive, segmental portion forming a relatively low reluctance magnetic circuit in said air gap space resulting in a region of relatively higher magnetic flux density in the peripheral surface area of said segmental rotor portion and at least one electric current conducting coil carried by said rotor structure, said coil having two segments extending axially relative to the axis of revolution of said rotor structure with only one of said coil segments disposed within the region of relatively high magnetic flux density defined by said segmental rotor portion, said stator structure being formed with at least three axially-spaced pole-piece surfaces, said rotor assembly including at least three rotor structures with each rotor structure being revolvable in magnetically coupled association with a respective one of said pole-piece surfaces and each rotor structure being provided with at least one electric current conducting coil, said magnetic-field-producing means including at least two electromagnetic devices disposed in electromagnetically coupled relationship to said stator structure with each electromagnetic device being connected to a respective source of A.C. electrical power of the same frequency but with the phase relationships electrically displaced, each of said electromagnetic devices producing a magnetic field primarily coupled with a common stator pole and one other stator pole which is not primarily coupled with the magnetic field produced by said other electromagnetic device, said magnetic fields produced in said common stator pole forming an additional magnetic field of electrically displaced phase relationship.

6. A rotary electric machine according to claim 5 wherein said stator structure includes three center pole-pieces centrally disposed in a respective air gap space forming an annularly shaped air gap space in which a respective rotor structure is revolvably supported.

7. A rotary electric machine according to claim 5 wherein the center one of said three rotor structures is mechanically joined to an adjacent rotor structure by a low reluctance magnetic circuit.

8. A rotary electric machine according to claim 6 wherein said rotor structures are mounted on a common shaft formed from a magnetically conductive material.

9. A rotary electric machine comprising a stator assembly including a stator structure forming a magnetic circuit and defining a central air gap space of washer-like shape and magnetic-field-producing means supported in magnetically coupled relationship to said stator structure to produce a magnetic field in said air gap space, a rotor assembly including a rotor structure rotatably supported in said air gap space for revolution about an axis aligned with the longitudinal axis of said air gap space, said rotor structure being formed with at least one magnetically-conductive, segmental portion forming a relatively low reluctance magnetic circuit in said air gap space resulting in a region of relatively higher magnetic flux density in the peripheral surface area of said segmental rotor portion and at least one electric current conducting coil carried by said rotor structure, said coil having two segments extending radially relative to the axis of revolution of said rotor structure with only one of said coil segments disposed within the region of relatively high magnetic flux density defined by said segmental rotor portion, said stator structure being formed with a pair of axially spaced, opposed pole-piece surfaces defining an axial air gap space of elongated cylindrical shape, and said rotor structure being rotatably mounted between said surfaces.

References Cited

UNITED STATES PATENTS

| | | | |
|---|---|---|---|
| 2,103,931 | 12/1937 | Berger | 310—178 |
| 2,914,688 | 11/1959 | Matthews | 310—178 |
| 3,185,877 | 5/1965 | Sears | 310—178 |

OTHER REFERENCES

Steinmetz publication, "Theory and Calculation of Electrical Apparatus," 1st ed., 1917, McGraw-Hill Book Co., New York, N.Y.

MILTON O. HIRSHFIELD, Primary Examiner

R. SKUDY, Assistant Examiner

U.S. Cl. X.R.

310—67, 112, 178, 181

UNITED STATES PATENT OFFICE
CERTIFICATE OF CORRECTION

Patent No. 3,521,099　　　　　　　　　　　　　　　　　　July 21, 1970

Harry S. Jewusiak

It is certified that error appears in the above identified patent and that said Letters Patent are hereby corrected as shown below:

Column 1, line 64, and column 2, lines 56 and 59, "dipolar", each occurrence, should read -- bipolar --. Column 2, line 3, "acrylic" should read -- acyclic --. Column 10, line 73, "allustrated" should read -- illustrated --. Column 11, line 12, "annualr" should read -- annular --.

Signed and sealed this 16th day of March 1971.

(SEAL)
Attest:

Edward M. Fletcher, Jr.　　　　　　　　　　　　WILLIAM E. SCHUYLER, JR.
Attesting Officer　　　　　　　　　　　　　　　　　Commissioner of Patents